(12) United States Patent
Petri

(10) Patent No.: US 7,857,110 B2
(45) Date of Patent: Dec. 28, 2010

(54) DISK BRAKE

(75) Inventor: Ralph Petri, Sulzbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 458 days.

(21) Appl. No.: 11/793,897

(22) PCT Filed: Jan. 18, 2006

(86) PCT No.: PCT/EP2006/050285

§ 371 (c)(1),
(2), (4) Date: May 1, 2008

(87) PCT Pub. No.: WO2006/077226

PCT Pub. Date: Jul. 27, 2006

(65) Prior Publication Data

US 2010/0012439 A1    Jan. 21, 2010

(30) Foreign Application Priority Data

Jan. 18, 2005   (DE) ................... 10 2005 002 415
Sep. 30, 2005   (DE) ................... 10 2005 046 805

(51) Int. Cl.
*F16D 55/08*      (2006.01)
(52) U.S. Cl. .................... 188/72.8; 188/71.9
(58) Field of Classification Search ........... 188/71.8, 188/71.9, 72.6–72.9
See application file for complete search history.

(56) References Cited

U.S. PATENT DOCUMENTS

| 4,819,854 | A | * | 4/1989 | Schmehr ............. 277/576 |
| 5,152,376 | A | * | 10/1992 | Weiler et al. ............ 188/2 D |
| 5,697,474 | A | * | 12/1997 | Antony et al. ............ 188/72.6 |
| 6,264,010 | B1 | * | 7/2001 | Doll et al. ............ 188/72.8 |

FOREIGN PATENT DOCUMENTS

| DE | 1 805 450 | 8/1969 |
| DE | 196 44 512 A1 | 4/1998 |
| DE | 101 04 158 A1 | 8/2002 |
| DE | 102 08 032 A1 | 9/2003 |
| EP | 0 649 993 A1 | 4/1995 |
| EP | 1 096 169 A2 | 5/2001 |

* cited by examiner

*Primary Examiner*—Christopher P Schwartz
(74) *Attorney, Agent, or Firm*—RatnerPrestia

(57) ABSTRACT

A disc brake with a rotatable and axially displaceable shaft for actuation, and with an actuating element. Further, a sealing means with a sealing portion is provided, which acts elastically on an associated sealing surface, with the sealing portion closing a slot between the sealing surface and the housing for sealing purposes and abutting on a stop. The stop, the sealing surface and the actuating element are designed integrally. This measure allows significantly reducing the production costs because the complexity of components is decreased and the assembly is thus simplified.

11 Claims, 2 Drawing Sheets

DISK BRAKE

This application is the U.S. national phase application of PCT International Application No. PCT/EP2006/050285, filed Jan. 18, 2006, which claims priority to German Patent Application No. DE102005002415.7, filed Jan. 18, 2005 and German Patent Application No. DE102005046805.5, filed Sep. 30, 2005, the contents of such applications being incorporated by reference herein.

BACKGROUND OF THE INVENTION

The present invention relates to a disc brake with a shaft for actuation, which is supported in a housing in a rotatable and axially displaceable manner and extends with one shaft end through a housing opening, with an actuating element being arranged on the shaft end. Further, a sealing means with a sealing portion is provided, which acts elastically on an associated sealing surface. In consequence of an axial movement of the shaft, the sealing portion is movable on the associated sealing surface transversely to the axial movement of the shaft, and is limited by a stop, with the sealing portion closing a slot between the sealing surface and the housing for sealing purposes.

DE 101 04 158 A1 discloses a combined disc brake caliper. A sealing portion acts between the housing and an actuating element attached to the shaft. The actuating element includes an additional sleeve, on which the sealing portion having the shape of a sealing lip is elastically seated and sliding. For activation of a parking brake function, the shaft along with the actuating element performs a rotation and an axial movement in relation to the housing. In particular the axial movement impairs the sealing function because it causes a radial movement between sealing portion and sealing surface. Cyclic radial movements can cause dirt to move successively from the sealing portion into the housing interior. It is especially disadvantageous that additional effort is needed for the manufacture and assembly of actuating element and sleeve, because the complexity of production and production costs are increased as a result.

Based on the above, an object of the invention is to disclose a brake disc with a sealing means, which has a simple construction and safeguards an improved sealing effect in all operating conditions.

SUMMARY OF THE INVENTION

According to at least one aspect of the invention, the sealing surface, and the actuating element have an integral design. This measure allows significantly reducing the production costs, because the complexity of components decreases, thus simplifying the assembly. Separate components, sleeves or like parts are not necessary.

In a favorable embodiment of the invention, the stop is arranged to be circumferential on the actuating element. It is thereby ensured that the sealing portion of the sealing means is fixed over the entire circumference in terms of a possible transverse movement on the actuating element, and optimal sealing is thus achieved.

In order to prevent a slot from developing between the sealing portion and the actuating element upon axial movement of the shaft, the stop is disposed radially farther outwards than the sealing portion. A distance (B) between stop and shaft is hence larger than a distance (A) between sealing portion and shaft. It is achieved by this geometric constellation of stop and sealing portion that with each axial movement of the shaft, instead of a transverse movement, an upsetting deformation of the sealing portion is caused and the development of a slot is counteracted.

In another design of the invention, the stop is configured as a tubular projection, projecting in the direction of the housing. This is advantageous in that the tubular projection serves as a discharge channel and impact protection for the sealing portion and protects the sealing portion against spray water, dirt and impacts.

In an another design of the invention, the stop is a flank of a recess. The recess that is indented in the actuating element accommodates part of the sealing portion, and a flank acts as a stop, preventing a transverse movement of the sealing portion. As the recess can fix the sealing portion radially in two directions, the very favorable effect is achieved that the sealing portion is prevented from buckling in the direction of the shaft. The sealing effect is thereby maintained under all circumstances.

In another favorable embodiment of the invention, the sealing means is furnished with another sealing portion, which acts elastically on an associated sealing surface on the shaft.

Further, the sealing surface has at least one stop for the axial fixation of the sealing portion. The redundant arrangement of two sealing portions in total allows improving the seal-tightness and increasing the useful life.

Favorably, the stop on the shaft can represent an indented circumferential groove, which fixes the above-referenced sealing portion axially in position. A groove can be indented during the manufacture of the shaft without entailing much effort, and no additional costs of manufacture are incurred hereby. The sealing portion is so-to-speak buttoned into the groove.

For further reduction of the costs of manufacture, it is suggested to make the stops on the shaft and/or on the actuating element by means of non-cutting manufacturing processes, in particular by stamping or pressing.

Further details of the invention can be taken from the drawings by way of the description.

DETAILED DESCRIPTION OF THE PREFERRED EMBODIMENTS

Figure 1:
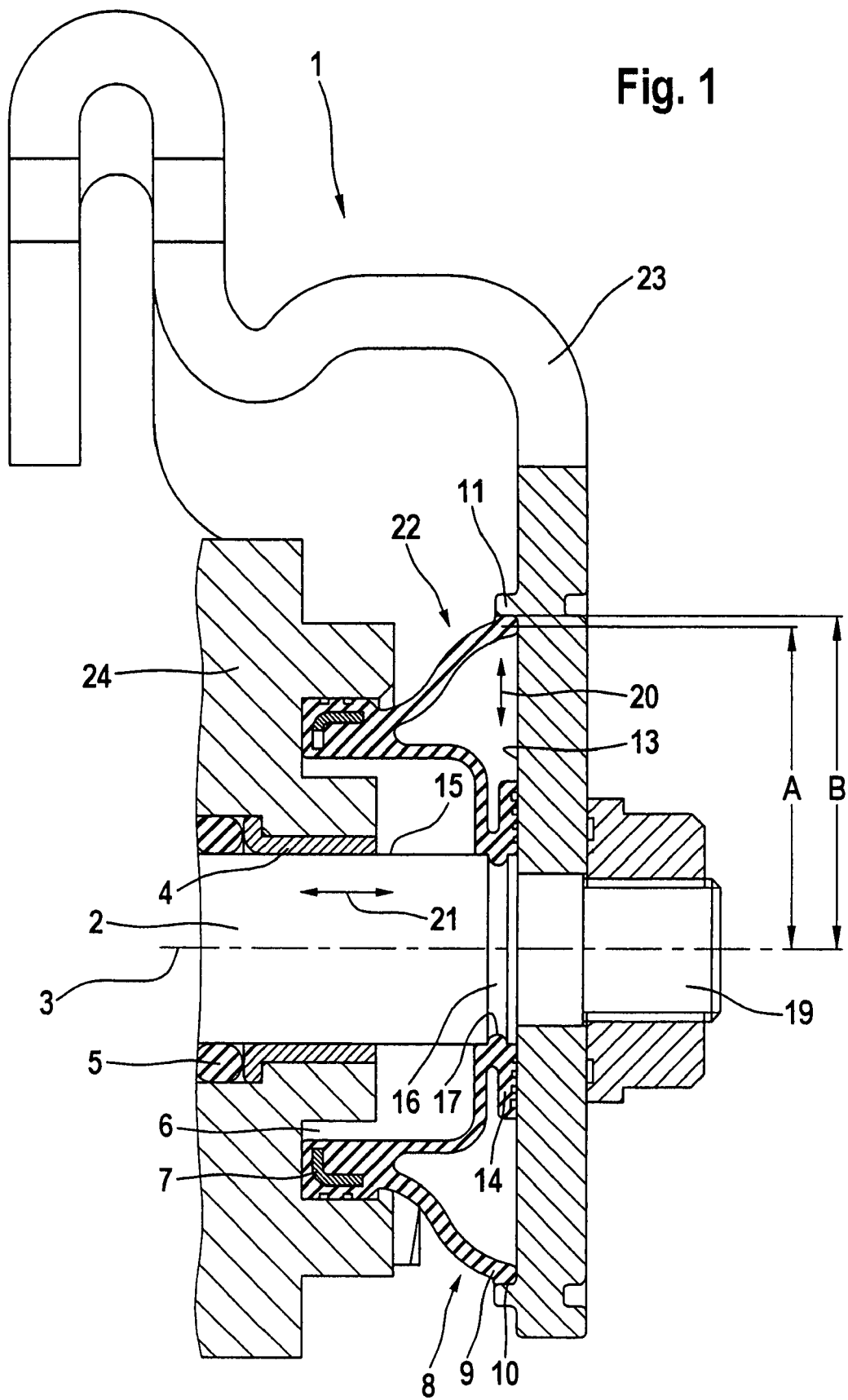
FIG. 1 is a partial cross-sectional enlarged view of a disc brake, with a tubular projection acting as a stop.

A disc brake of the invention is explained in connection with FIGS. 1 and 2. Only relevant parts of a combined disc brake caliper is shown. The two Figures exhibit different embodiments, and corresponding features have been assigned like reference numerals.

Principally, a disc brake 1 of this type is employed in combined disc brake calipers, which permit both a service brake operation and a parking brake operation. Combined disc brake calipers of this type frequently include a shaft 2, which extends with a shaft end 19 through the housing 24. Shaft 2 frequently cooperates within the housing 24 especially with a (non-illustrated) ramp device or an eccentric device for the operation of the parking brake. The mounting support of the shaft 2 in the housing 24 is carried out by means of a slide bush 4. Since pressurized working medium is available in an inner space of the housing 24, a seal 5 is mounted on the slide bush 4 between housing 24 and shaft 2, preventing leakage of the working medium. Outside the housing 24, an actuating element 23 is fastened at the shaft end 19 of the shaft 2 in order to introduce an actuating force into the housing 24 of the combined disc bake caliper.

FIG. 1 further shows a first embodiment of the disc brake 1 of the invention with a sealing means 22. It mainly comprises two sealing portions 8, 14, an axial sealing surface 13 at the actuating element 23, and a radial sealing surface 15 on the shaft 2. The sealing means 22 annularly encloses the shaft 2 and is rotatably arranged in a housing groove 6. A clamping element 7 is provided in the sealing means 22, clamping the sealing means 22 in the housing groove 6. The sealing portion 14 shuts off and seals a slot between the housing 1 and the shaft 2, with the sealing portion 14 bearing against the sealing surface 15 of the shaft 2 and being arrested by a stop 17 in an axial direction. According to this embodiment, the stop 17 is formed of a circumferential groove 16 in the shaft 2. Shaft steps or other projections on the shaft, acting as axially fixing stops, are also feasible. In order to further improve the sealing effect of the sealing portion 14, the latter also bears against the axial sealing surface 13, with the effective area of the sealing portion 14 being configured as a labyrinth seal.

The sealing portion 8 abuts on the axial sealing surface 13 and on the stop 10, thereby closing a slot between the actuating element 23 and the housing 1. In this arrangement, the sealing portion 8 is designed as a sealing lip 9. It is significant in this respect that the distance B between the stop 10 and an axis 3 of the shaft 2 is larger than a distance A between the sealing portion 8 and the axis 3. In the present case, the stop 10 is arranged at a tubular projection 11, which is made from the actuating element 23 in shaping processes. When the projection 11 is made, it is preferred to produce the sealing surface 13 in the same shaping process.

The function of the sealing device of FIG. 1 is illustrated in the following. The shaft 2 and the actuating element 23 are mounted rotatably and axially displaceably in the housing 24 and serve to transmit an actuating force when a parking brake function is required. Upon actuation of the parking brake, the shaft 2 and the actuating element 23 are turned. The components 2, 23 simultaneously perform an axial movement 21.

As the sealing means 22 is immovably arranged in the housing 24, the shaft 2 and the actuating element 23 perform a movement relative to the sealing portions 8 and 14.

To prevent the sealing portion 14 from wandering axially on the shaft 2, a groove 16 is provided on the shaft 2. The groove ensures that the sealing portion 14 also performs the axial movement 21 of the shaft 2. A rotation between shaft 2 and sealing portion 14 is allowed at the same time. It is safeguarded this way that the sealing portion 14 is always active on the sealing surface 15 on the shaft 2 and on the sealing surface 13 at the actuating element 13.

The sealing lip 9 of the sealing portion 8 bears against the stop 10 and against the sealing surface 13 of the actuating 23, siding on the sealing surface 13 and on the stop 10 due to the rotation of the actuating element 23. Since the shaft 2 and the actuating element 23 perform an axial movement 21 and the stop 10 prevents a radial movement 20 of the sealing lip 9 on the sealing surface 13, the sealing portion 8 is upset at the stop 10. On the one hand, it is thus prevented that the sealing lip 9 conveys dirt and sediments into the sealing device due to a radial movement 20. On the other hand, the upsetting deformation produces a contact pressure between sealing surface 13, stop 10 and sealing lip 9, what contributes to improving the sealing effect. In addition, the stop 10 designed as projection 11 acts as a discharge channel and impact protection for the sealing lip 9, thus keeping away dirt and the ingress of moisture.

A second embodiment is explained in connection with FIG. 2. As the basic design of both embodiments is identical, only the differences will be dealt with in the following. The differences can be seen in that the stop 10 is not formed by a projection 11 (FIG. 1), but by a flank of a recess 12. To make this recess 12, non-cutting processes such as stamping or pressing can be used, which are principally less cost-intensive than cutting shaping processes.

Figure 2:
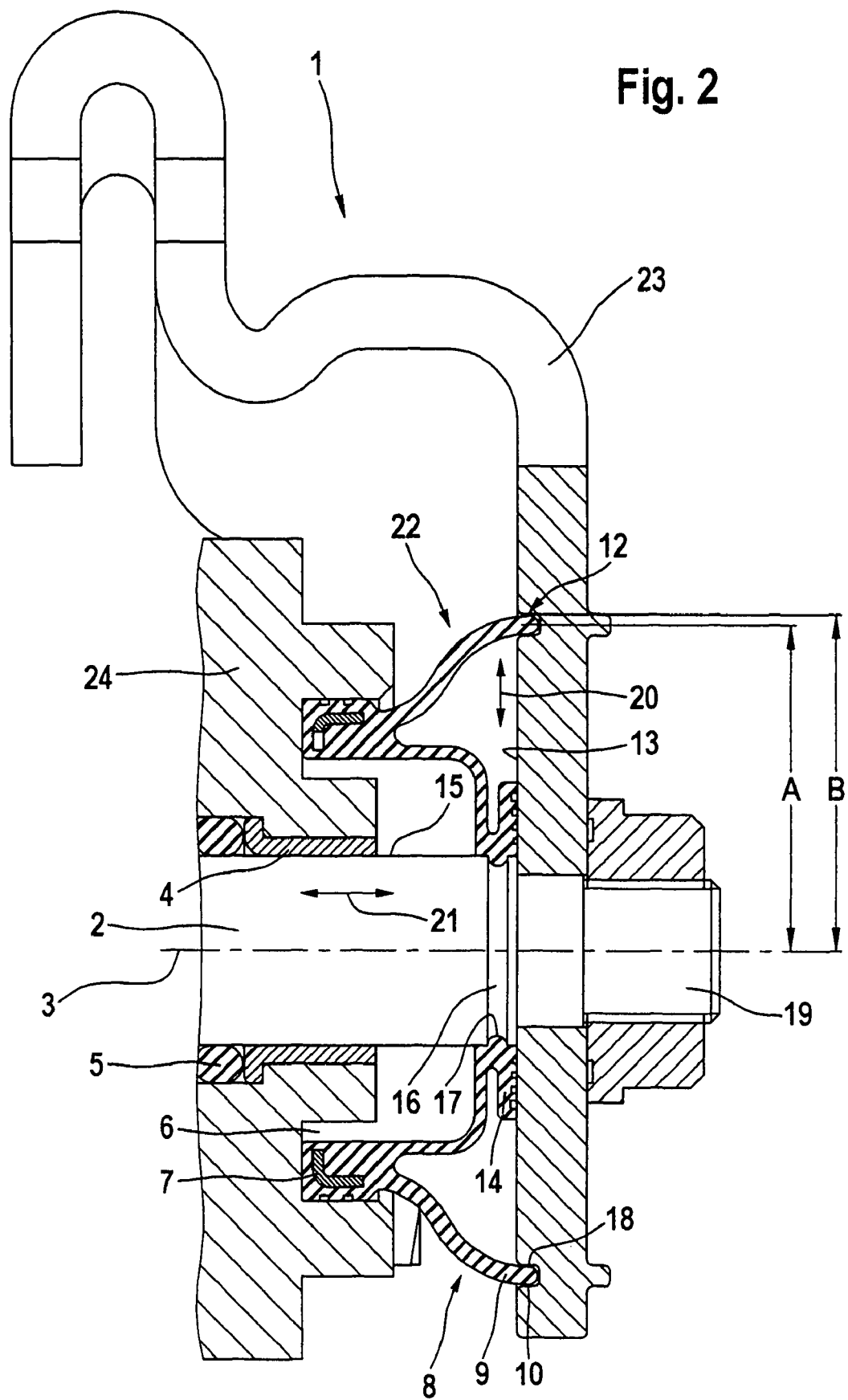
FIG. 2 shows an embodiment of the invention, a stop being provided by a flank of a recess.

To explain the mode of operation of the embodiment of Figure 2, reference is made to the description of FIG. 1. However, it shall be stated that the shape of the stop 10 as recess 12 has the following advantage in terms of function. As the recess 12 accommodates part of the sealing lip 9 of the sealing portion 8, a radial movement 20 on the actuating element 23 is completely ruled out, because the sealing lip abuts on both flanks of the recess 12. The flank of the recess 12 pointing away from the axis 3 assumes the function of the stop 10, while the flank of the recess 12 pointing to the axis forms another stop 18. Stop 18 prevents the sealing portion or the sealing lip 9, respectively, from buckling towards shaft 2. The sealing effect of the sealing means 22 and the safety against buckling is considerably improved thereby.

The invention claimed is:

1. Disc brake with a shaft for actuation of a parking brake, the shaft is supported in a housing in a rotatable and axially displaceable manner and extends with a first shaft end through a housing opening, with an actuating element being arranged on the first shaft end, including a sealing means with a sealing portion which acts elastically on an associated sealing surface and, in consequence of an axial movement of the shaft on the sealing surface, is movable transversely to the axial movement of the shaft, and is limited by a stop, with the sealing portion closing a slot between the sealing surface and the housing for sealing purposes, wherein the stop, the sealing surface and the actuating element have an integral design.

2. Disc brake as claimed in claim 1,
wherein the sealing means includes a second sealing portion, which acts elastically on an associated sealing surface on the shaft, the sealing surface having at least one shaft stop for the axial fixation of the second sealing portion.

3. Disc brake as claimed in claim 2,
wherein the shaft stop is made by non-cutting manufacturing processes.

4. Disc brake as claimed in claim 3,
wherein the shaft stop is made by stamping or pressing operations.

5. Disc brake as claimed in claim 1,
wherein the stop is made by non-cutting manufacturing processes.

6. Disc brake as claimed in claim 2,
wherein the shaft stop is provided as a circumferential groove indented into the shaft.

7. Disc brake as claimed in claim 1,
wherein the stop is arranged on the actuating element in a circumferential manner.

8. Disc brake as claimed in claim 1,
wherein a distance (B) between the stop and the shaft is larger than a distance (A) between the sealing portion and the shaft.

9. Disc brake as claimed in claim 1,
wherein the stop is configured as a tubular projection and projects in the direction of the housing.

10. Disc brake as claimed in claim 1,
wherein the stop is formed by a flank of a recess.

11. Disc brake as claimed in claim 5,
wherein the stop is made by stamping or pressing operations.

* * * * *